(12) United States Patent
Omi

(10) Patent No.: US 12,670,693 B2
(45) Date of Patent: Jun. 30, 2026

(54) INDEX CALCULATING APPARATUS, INDEX CALCULATION METHOD, AND RECORDING MEDIUM

(71) Applicant: NEC Corporation, Tokyo (JP)

(72) Inventor: Yasuo Omi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 267 days.

(21) Appl. No.: 18/288,859

(22) PCT Filed: Jan. 23, 2023

(86) PCT No.: PCT/JP2023/001955
§ 371 (c)(1),
(2) Date: Oct. 30, 2023

(87) PCT Pub. No.: WO2024/157332
PCT Pub. Date: Aug. 2, 2024

(65) Prior Publication Data
US 2025/0078449 A1     Mar. 6, 2025

(51) Int. Cl.
*G06V 10/75* (2022.01)
*G06V 10/776* (2022.01)
*G06V 10/82* (2022.01)

(52) U.S. Cl.
CPC .......... *G06V 10/751* (2022.01); *G06V 10/776* (2022.01); *G06V 10/82* (2022.01)

(58) Field of Classification Search
USPC ................................. 382/133, 156–157, 159
See application file for complete search history.

(56) References Cited

U.S. PATENT DOCUMENTS

| | | | |
|---|---|---|---|
| 12,106,550 B2 * | 10/2024 | Cosatto | G06V 10/82 |
| 12,288,325 B2 * | 4/2025 | Cosatto | G06V 20/698 |

(Continued)

FOREIGN PATENT DOCUMENTS

| | | |
|---|---|---|
| CN | 114868124 A | 8/2022 |
| JP | 2020-013555 A | 1/2020 |

(Continued)

OTHER PUBLICATIONS

Hema et al., Region-Based Segmentation and Classification for Ovarian Cancer Detection Using Convolution Neural Network, Contrast Media & Molecular Imaging, vol. 2022, Article ID 5968939, http://doi.org/10.1155/2022/5968939, (Year: 2022).*

(Continued)

*Primary Examiner* — Ishrat I Sherali
(74) *Attorney, Agent, or Firm* — Sughrue Mion, PLLC

(57) ABSTRACT

In order to calculate an index that properly indicates the degree of accuracy of a prediction result outputted by a machine learning model, an index calculating apparatus includes at least one processor, and the at least one processor carries out: a comparing process of comparing a characteristic of a training image used in machine learning of the machine learning model which receives, as an input, an image to be subjected to inference, to classify the image and a characteristic of an input image to be inputted to the machine learning model at a time of inference; and a calculating process of calculating, in accordance with a difference between the characteristic of the training image and the characteristic of the input image which have been compared with each other in the comparing process, an index which indicates a possibility of error in a classification result obtained in a case where the input image is inputted to the machine learning model.

5 Claims, 6 Drawing Sheets

(56) References Cited

U.S. PATENT DOCUMENTS

| | | | |
|---|---|---|---|
| 2020/0074238 A1 | 3/2020 | Umeno et al. | |
| 2022/0301288 A1 | 9/2022 | Higuchi et al. | |
| 2023/0086722 A1* | 3/2023 | Larson | G01N 33/57415 |
| | | | 435/6.14 |

FOREIGN PATENT DOCUMENTS

| | | | |
|---|---|---|---|
| JP | 2020-103880 A | 7/2020 | |
| JP | 2021-018772 A | 2/2021 | |
| JP | 2022-076203 A | 5/2022 | |
| JP | 2022-142197 A | 9/2022 | |
| WO | 2019/187372 A1 | 10/2019 | |
| WO | 2022/244787 A1 | 11/2022 | |
| WO | WO-2023039529 A1 * | 3/2023 | G01N 33/57488 |

OTHER PUBLICATIONS

Ranjana et al., Breast Cancer Detection Using Autoencoder with Convolution Neural Network, IEEE ISBN: 979-8-3315-4066-1, pp. 1391-1399. (Year: 2024).*
International Search Report for PCT Application No. PCT/JP2023/001955, mailed on Apr. 11, 2023.
English translation of International Search Report for PCT Application No. PCT/JP2023/001955, mailed on Apr. 11, 2023.
Extended European Search Report for EP Application No. 23918305. 6, dated on Jan. 30, 2026.

* cited by examiner

FIG. 3

Mean value A1 ┊ Mode value F1

Median value M1

Mean value A2 ┊ Mode value F2

Median value M2

INDEX CALCULATING APPARATUS, INDEX CALCULATION METHOD, AND RECORDING MEDIUM

This application is a National Stage Entry of PCT/JP2023/001955 filed on Jan. 23, 2023, the contents of all of which are incorporated herein by reference, in their entirety.

TECHNICAL FIELD

The present invention relates to an index calculating apparatus, an index calculation method, and a recording medium for calculating an index regarding a prediction result outputted by a machine learning model.

BACKGROUND ART

Machine learning models output, along with a prediction result, a certainty factor obtained by estimating the degree of accuracy of the prediction result. However, there is a possibility that the prediction result is wrong even when the certainty factor is high. Thus, a technique for indicating the degree of accuracy of a prediction result with use of an indicator other than a certainty factor.

Patent Literature 1 discloses an image processing apparatus for generating, from a first medical image of a sample being tested, a second medical image obtained by using a trained model to perform image quality improvement processing on the first medical image. According to the image processing apparatus disclosed in Patent Literature 1, the difference in pixel value between images before and after the image quality improvement processing performed via the trained model is calculated, and in a case where the difference is greater than a predetermined value (e.g., in a case where tissue which does not really exist is generated), an operator is alerted.

CITATION LIST

Patent Literature

[Patent Literature 1]
  Japanese Patent Application Publication, Tokukai, No. 2020-103880

SUMMARY OF INVENTION

Technical Problem

However, in the image processing apparatus disclosed in Patent Literature 1, the case where the training image used in the learning of the trained model does not agree in the characteristics of data with the first medical image (the case of domain shift) is not considered.

An example aspect of the present invention has been made in view of the above problem, and an example object thereof is to provide a technique for calculating an index which properly indicates the degree of accuracy of a prediction result outputted by a machine learning model.

Solution to Problem

An index calculating apparatus in accordance with an example aspect of the present invention includes at least one processor, and the at least one processor carries out: a comparing process of comparing a characteristic of a training image used in machine learning of a machine learning model which receives, as an input, an image to be subjected to inference, to classify the image and a characteristic of an input image to be inputted to the machine learning model at a time of inference; and a calculating process of calculating, in accordance with a difference between the characteristic of the training image and the characteristic of the input image which have been compared with each other in the comparing process, an index which indicates a possibility of error in a classification result obtained in a case where the input image is inputted to the machine learning model.

An index calculation method in accordance with an example aspect of the present invention includes: at least one processor comparing a characteristic of a training image used in machine learning of a machine learning model which receives, as an input, an image to be subjected to inference, to classify the image and a characteristic of an input image to be inputted to the machine learning model at a time of inference; and the at least one processor calculating, in accordance with a difference between the characteristic of the training image and the characteristic of the input image which have been compared with each other in the comparing, an index which indicates a possibility of error in a classification result obtained in a case where the input image is inputted to the machine learning model.

A recording medium in accordance with an example aspect of the present invention is a computer-readable, non-transitory recording medium having recorded thereon a program for causing a computer to function as an index calculating apparatus, the program causing the computer to carry out: a comparing process of comparing a characteristic of a training image used in machine learning of a machine learning model which receives, as an input, an image to be subjected to inference, to classify the image and a characteristic of an input image to be inputted to the machine learning model at a time of inference; and a calculating process of calculating, in accordance with a difference between the characteristic of the training image and the characteristic of the input image which have been compared with each other in the comparing process, an index which indicates a possibility of error in a classification result obtained in a case where the input image is inputted to the machine learning model.

Advantageous Effects of Invention

With an example aspect of the present invention, it is possible to calculate an index which properly indicates the degree of accuracy of a prediction result outputted by a machine learning model.

BRIEF DESCRIPTION OF DRAWINGS

FIG. 3 is a block diagram illustrating a configuration of a prediction error notifying apparatus in accordance with a second example embodiment of the present invention.

EXAMPLE EMBODIMENTS

First Example Embodiment

The following description will discuss a first example embodiment of the present invention in detail, with reference to the drawings. The present example embodiment is basic to an example embodiment which will be described later.

(Configuration of Index Calculating Apparatus 1)

An index calculating apparatus 1 in accordance with the present example embodiment is an apparatus for comparing a characteristic of a training image used in machine learning of a machine learning model which receives, as an input, an image to be subjected to inference, to classify the image and a characteristic of an input image to be inputted to the machine learning model at a time of inference. In addition, the index calculating apparatus 1 in accordance with the present example embodiment calculates, in accordance with a difference between the characteristic of the training image and the characteristic of the input image at a time of inference that have been compared with each other, an index which indicates a possibility of error in a classification result obtained in a case where the input image is inputted to the machine learning model at the time of inference.

Figure 1:
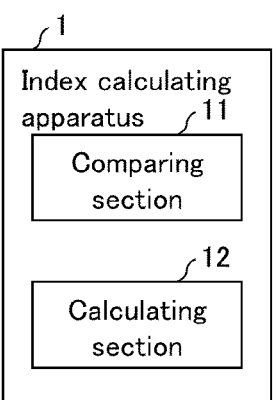
FIG. 1 is a block diagram illustrating a configuration of an index calculating apparatus in accordance with a first example embodiment of the present invention.

A configuration of the index calculating apparatus 1 in accordance with the present example embodiment is described with reference to FIG. 1. FIG. 1 is a block diagram illustrating a configuration of the index calculating apparatus 1 in accordance with the present example embodiment.

The index calculating apparatus 1 in accordance with the present example embodiment includes a comparing section 11 and a calculating section 12, as illustrated in FIG. 1. In the present example embodiment, the comparing section 11 and the calculating section 12 are components for implementing the comparing means and the calculating means, respectively.

The comparing section 11 compares a characteristic of a training image used in machine learning of a machine learning model which receives, as an input, an image to be subjected to inference, to classify the image and a characteristic of an input image to be inputted to the machine learning model at a time of inference.

The calculating section 12 calculates, in accordance with a difference between the characteristic of the training image and the characteristic of the input image that have been compared with each other by the comparing section 11, an index which indicates a possibility of error in a classification result obtained in a case where the input image is inputted to the machine learning model.

For example, the calculating section 12 may treats the difference between the characteristic of the training image and the characteristic of the input image at a time of inference that have been compared with each other by the comparing section 11, as an index which indicates a possibility of error in a classification result obtained in a case where the input image is inputted to the machine learning model at the time of inference.

In this case, in a case where the difference between the characteristic of the training image and the characteristic of the input image at a time of inference that have been compared with each other by the comparing section 11 is large, the value of an index which indicates a possibility of error in a classification result obtained in a case where the input image is inputted to the machine learning model at the time of inference is large. Conversely, in a case where the difference between the characteristic of the training image and the characteristic of the input image at a time of inference that have been compared with each other by the comparing section 11 is small, the value of an index which indicates a possibility of error in a classification result obtained in a case where the input image is inputted to the machine learning model at the time of inference is small.

As above, the configuration employed in the index calculating apparatus 1 in accordance with the present example embodiment is such that a comparing section 11 and a calculating section 12 are included, the comparing section 11 being for comparing a characteristic of a training image used in machine learning of a machine learning model which receives, as an input, an image to be subjected to inference, to classify the image and a characteristic of an input image to be inputted to the machine learning model at a time of inference, the calculating section 12 being for calculating, in accordance with a difference between the characteristic of the training image and the characteristic of the input image that have been compared with each other by the comparing section 11, an index which indicates a possibility of error in a classification result obtained in a case where the input image is inputted to the machine learning model.

With this configuration, in the index calculating apparatus s 1 in accordance with the present example embodiment, in a case of disagreement (domain shift) between the data characteristics of a training image used in machine learning of a machine learning model and an input image to be inputted to the machine learning model at a time of inference, the value of an index which indicates a possibility of error in a classification result obtained in a case where the input image is inputted to the machine learning model at the time of inference is large. In other words, in the index calculating apparatus 1 in accordance with the present example embodiment, in a case where there is a high possibility that domain shift has occurred, an index is calculated, the index indicating that the possibility of error in the classification result obtain in a case where the input image is inputted to the machine learning model at a time of inference is high.

Thus, the index calculating apparatus 1 in accordance with the present example embodiment provides an example advantage of being capable of calculating an index which properly indicates the degree of accuracy of a prediction result outputted by a machine learning model.

(Flow of Index Calculation Method S1)

Figure 2:
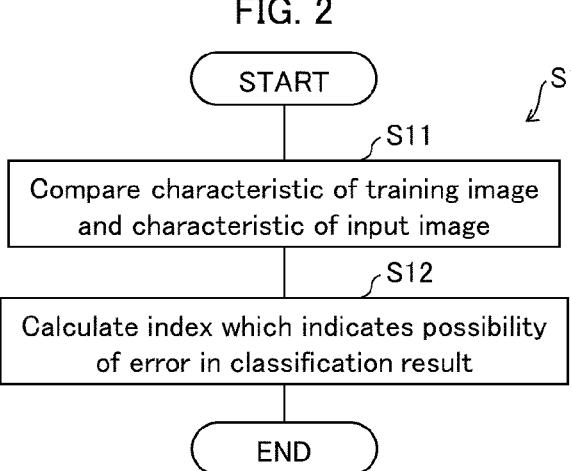
FIG. 2 is a diagram illustrating a flow of an index calculation method in accordance with the first example embodiment of the present invention.

A flow of an index calculation method S1 in accordance with the present example embodiment will be described with reference to FIG. 2. FIG. 2 is a flowchart illustrating a flow of the index calculation method S1 in accordance with the present example embodiment.

(Step S11)

In step S11, the comparing section 11 compares a characteristic of a training image used in machine learning of a machine learning model which receives, as an input, an image to be subjected to inference, to classify the image and a characteristic of an input image to be inputted to the machine learning model at a time of inference.

(Step S12)

In step S12, the calculating section 12 calculates, in accordance with a difference between the characteristic of the training image and the characteristic of the input image that have been compared with each other by the comparing section 11 in step S11, an index which indicates a possibility of error in a classification result obtained in a case where the input image is inputted to the machine learning model.

For example, in step S12, the calculating section 12 may treat the difference between the characteristic of the training image and the characteristic of the input image at a time of inference that were compared with each other by the comparing section 11 in step S11, as an index which indicates a possibility of error in a classification result obtained in a case where the input image is inputted to the machine learning model at the time of inference.

In this case, in a case where the difference between the characteristic of the training image and the characteristic of the input image at a time of inference that have been compared with each other by the comparing section 11 is large, the value of an index which indicates a possibility of error in a classification result obtained in a case where the input image is inputted to the machine learning model at the time of inference is large. Conversely, in a case where the difference between the characteristic of the training image and the characteristic of the input image at a time of inference that have been compared with each other by the comparing section 11 is small, the value of an index which indicates a possibility of error in a classification result obtained in a case where the input image is inputted to the machine learning model at the time of inference is small.

As above, the configuration employed in the index calculation method S1 in accordance with the present example embodiment is such that step S11 and step S12 are included, the comparing section 11 comparing, in step S11, a characteristic of a training image used in machine learning of a machine learning model which receives, as an input, an image to be subjected to inference, to classify the image and a characteristic of an input image to be inputted to the machine learning model at a time of inference, the calculating section 12 calculating, in step S12, in accordance with a difference between the characteristic of the training image and the characteristic of the input image that were compared with each other by the comparing section 11 in step S11, an index which indicates a possibility of error in a classification result obtained in a case where the input image is inputted to the machine learning model.

Therefore, the index calculation method S1 in accordance with the present example embodiment provides the same example advantage that is provided by the index calculating apparatus 1 described above.

Second Example Embodiment

The following description will discuss a second example embodiment of the present invention in detail, with reference to the drawings. A component that has the same function as a component described in the first example embodiment is assigned the same reference sign, and the description thereof is omitted where appropriate.

(Outline of Prediction Error Notifying Apparatus 2)

A prediction error notifying apparatus 2 in accordance with the present example embodiment is an apparatus for comparing a characteristic of a training image used in machine learning of a machine learning model which receives, as an input, an image to be subjected to inference, to classify the image and a characteristic of an input image to be inputted to the machine learning model at a time of inference.

Examples of the image to be inputted to the machine learning model at a time of inference include a pathological image in which a cell specimen is contained as a subject. In this case, the machine learning model may have a configuration so as to output a classification result which indicates whether a cell specimen contained as a subject in an inputted pathological image is benign or malignant.

As an example of the machine learning model, a convolution neural network (CNN), a recurrent neural network (RNN), or a combination thereof can be used. Alternatively, a non-neural network model such as a random forest or a support vector machine may be used.

The characteristic of the training image and the characteristic of the input image at the time of inference are not particularly limited, but examples thereof include: the color or brightness of the input image at the time of inference and the training image; the level of noise contained in the input image at the time of inference and the training image; a latent vector obtained by inputting the training image and the input image at the time of inference to an autoencoder AE which has been trained with use of the training image. The autoencoder AE and the latent vector will be described later.

The prediction error notifying apparatus 2 in accordance with the present example embodiment calculates, in accordance with a difference between the characteristic of the training image and the characteristic of the input image that have been compared with each other, an index which indicates a possibility of error in a classification result obtained in a case where the input image at the time of inference is inputted to the machine learning model. Thus, the prediction error notifying apparatus 2 has the function that is included in the index calculating apparatus 1 described above.

As an example, the index that indicates a possibility of error in a classification result obtained in a case where the input image is inputted to the machine learning model at a time of inference may be a difference per se between the characteristic of the training image and the characteristic of the input image at the time of inference that have been compared with each other. As another example, the index that indicates a possibility of error in a classification result obtained in a case where the input image is inputted to the machine learning model at a time of inference may be a probability that the classification result is estimated to be erroneous.

In addition, in a case where the prediction error notifying apparatus 2 has judged that there is a possibility that a classification result is erroneous, the prediction error notifying apparatus 2 in accordance with the present example embodiment notifies an indication of a possibility of error in the classification result. The manner in which the prediction error notifying apparatus 2 notifies the indication of a possibility of error in a classification result is not limited, but may be the display of an image which contains a text indicating the possibility of error in the classification result, or may be a voice output of an indication of the possibility of error in the classification result.

(Configuration of Prediction Error Notifying Apparatus 2)

Figure 3:
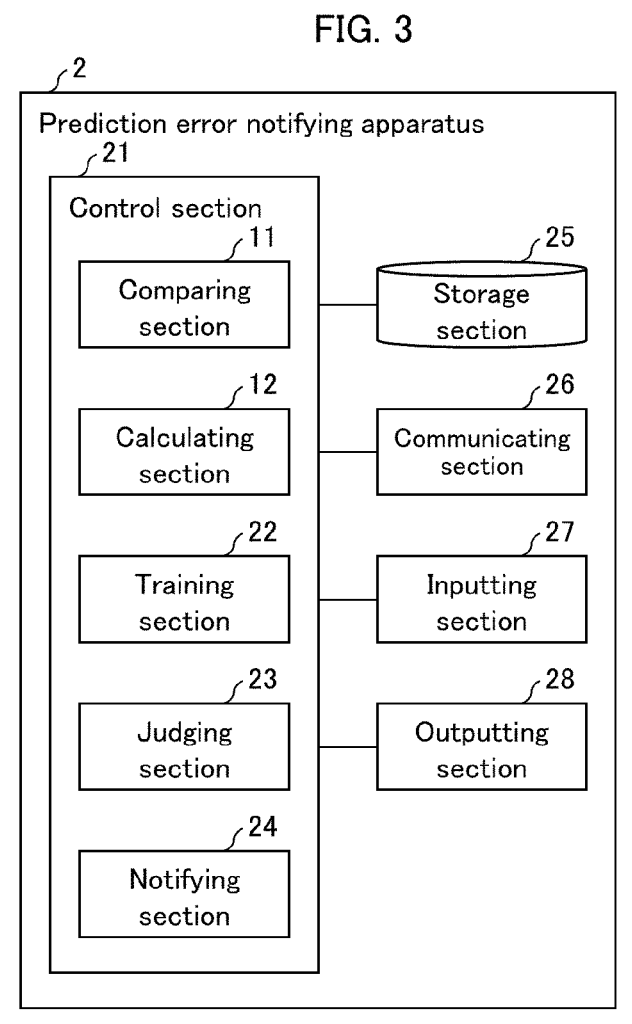

A configuration of the prediction error notifying apparatus 2 in accordance with the present example embodiment is described with reference to FIG. 3. FIG. 3 is a block diagram illustrating a configuration of the prediction error notifying apparatus 2 in accordance with the present example embodiment.

The prediction error notifying apparatus 2 in accordance with the present example embodiment includes a control section 21, a storage section 25, a communicating section 26, an inputting section 27, and an outputting section 28, as illustrated in FIG. 3.

In the storage section 25, data referred to by the control section 21 is stored. Examples of the data stored in the storage section 25 include: an input image at a time of inference; and a training image.

The communicating section 26 is a communication module for communicating with another apparatus which is connected to the prediction error notifying apparatus 2 via a network. As an example, the communicating section 26 receives a training image and an input image at the time of inference, outputs information indicating a possibility of error in a classification result, and carries out any other operation.

The inputting section 27 is an interface via which data is acquired from another apparatus which is connected to the prediction error notifying apparatus 2. As an example, the inputting section 27 acquires a training image or an input image at a time of inference.

The outputting section 28 is an interface via which data is outputted to another apparatus which is connected to the prediction error notifying apparatus 2. As an example, the outputting section 28 outputs information indicating a possibility of error in a classification result.

(Functions of Control Section 21)

The control section 21 controls each component included in the prediction error notifying apparatus 2. Further, the control section 21 includes a comparing section 11, a calculating section 12, a training section 22, and a judging section 23, and a notifying section 24, as illustrated in FIG. 3. In the present example embodiment, the comparing section 11, the calculating section 12, the judging section 23, and the notifying section 24 are components for implementing the comparing means, the calculating means, the judging means, and the notifying means, respectively. Examples of processes carried out by the comparing section 11, the calculating section 12, the judging section 23, and the notifying section 24 will be described later.

The comparing section 11 compares a characteristic of a training image used in machine learning of a machine learning model which receives, as an input, an image to be subjected to inference, to classify the image and a characteristic of an input image to be inputted to the machine learning model at a time of inference. The comparing section 11 stores the comparison result in the storage section 25.

A characteristic of the training image and a characteristic of the input image at a time of inference may be analyzed by another apparatus. In this case, the comparing section 11 compares the characteristic of the training image and the characteristic of the input image in accordance with the result of the analysis performed by the other apparatus. Alternatively, the analysis of the characteristic of the training image and the characteristic of the input image at a time of inference may be performed by the comparing section 11. Described below is a case where the comparing section 11 analyzes the characteristic of the training image and the characteristic of the input image at a time of inference.

The calculating section 12 calculates, in accordance with a difference between the characteristic of the training image and the characteristic of the input image at a time of inference that have been compared with each other by the comparing section 11, an index which indicates a possibility of error in a classification result obtained in a case where the input image is inputted to the machine learning model at the time of inference. The calculating section 12 stores the calculated index in the storage section 25.

The training section 22 trains the machine learning model with use of training images stored in the storage section 25. As an example, the training section 22 uses, as the training images, pathological images in which a cell specimen is contained as a subject, to train a machine learning model such that the machine learning model outputs the result of classification of whether the cell specimen is benign or malignant.

The judging section 23 judges whether the index calculated by the calculating section 12 is equal to or greater than a threshold value. The judging section 23 stores the judgment result in the storage section 25.

The notifying section 24 notifies a user of the result of classification made via the machine learning model. As an example, the notifying section 24 notifies the classification result and an indication of a possibility of error in the classification result, in a case where the judging section 23 has judged that the index is equal to or greater than a threshold value. The notifying section 24 may notify an indication of a possibility of error in the classification result, by outputting, via the communicating section 26 or the outputting section 28, information indicating the possibility of error in the classification result.

In addition, the notifying section 24 may further notify information regarding the index that has been judged to be equal to or greater than a threshold value, in a case where the judging section 23 has judged that the index is equal to or greater than the threshold value. Examples of the information regarding the index include: the index per se; and the characteristic compared by the comparing section 11 for calculation of the index.

(Example Process 1 Carried Out by Comparing Section 11)

Figure 4:
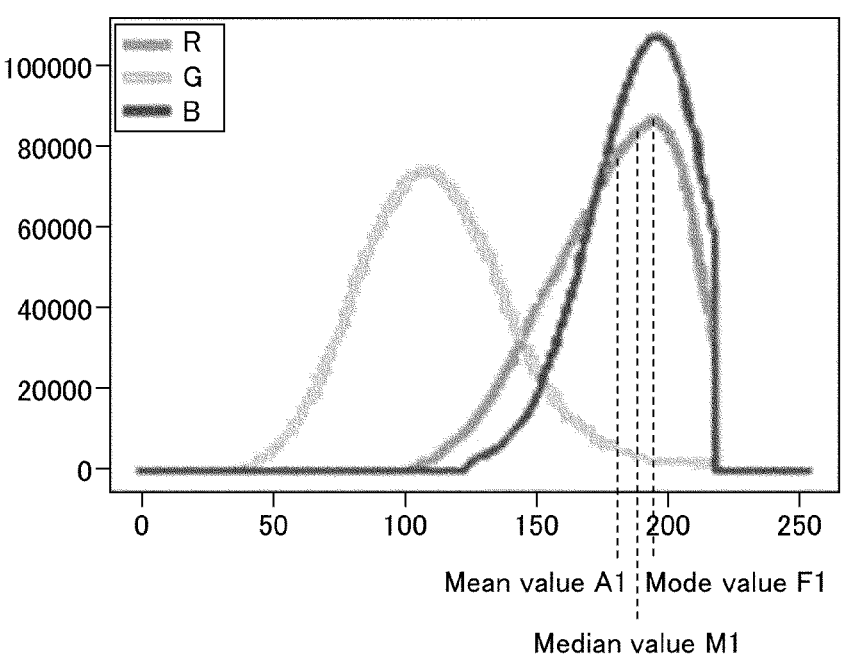
FIG. 4 is a diagram illustrating an example of the characteristic of a training image and an input image in the second example embodiment of the present invention.
Figure 4:
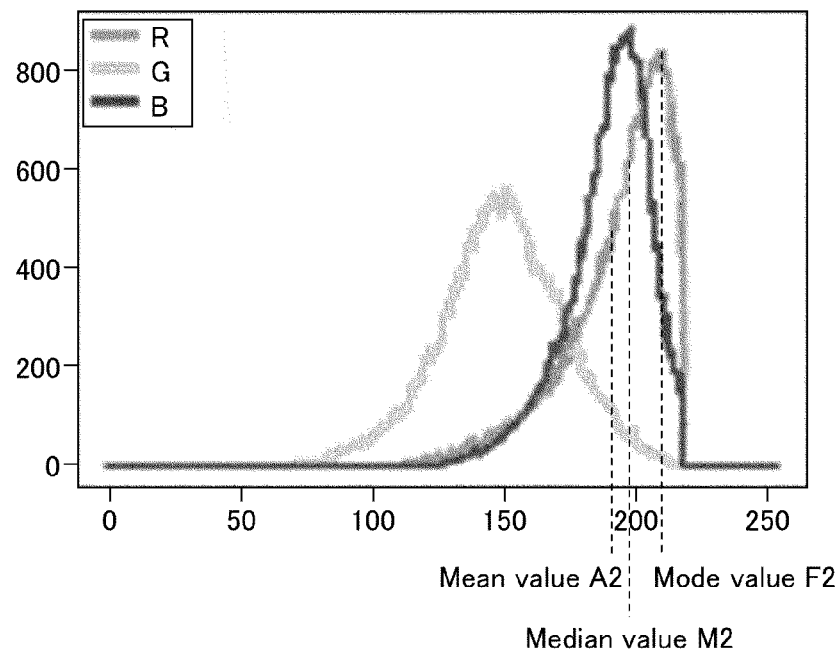

The comparing section 11 may compare the pixel values of each of the colors RGB between the training image and the input image at a time of inference, as the characteristic of the training image and the input image at a time of inference. Examples of the characteristics to be compared by the comparing section 11 in this configuration are illustrated in FIG. 4. FIG. 4 is a diagram illustrating an example of the characteristics of the training image and the input image at a time of inference in the present example embodiment. The upper side of FIG. 4 is a histogram of the pixel value of each of the colors RGB of the training image. The lower side of FIG. 4 is a histogram of the pixel value of each of the colors RGB of the input image at a time of inference. As illustrated in FIG. 4, the comparing section 11 uses the respective histograms of the training image and the input image at a time of inference, the histograms showing the relationship between the pixel value of each of the colors RGB and the number of pixels of that color, to make a comparison.

As an example, the comparing section 11 calculates the mean value, the median value, and the mode value of each of the colors RGB, to make a comparison. Illustrated as an example in FIG. 4 are the mean value A1, the median value M1, and the mode value F1 of R of the training image, and the mean value A2, the median value M2, and the mode value F2 of R of the input image at a time of inference.

As another example, the comparing section 11 may compare the HSV (hue, saturation, value) of the training image and the input image at a time of inference, instead of each of the colors RGB. Also in this case, the comparing section 11 may use a histogram which shows the relationship between the pixel value of each of HSV and the number of pixels of the corresponding one of HSV, to make the comparison.

(Example Process 2 Carried Out by Comparing Section 11)

The comparing section 11 may compare the respective levels of noise contained in the training image and the input image at a time of inference, which are characteristics of the training image and the input image at a time of inference.

Assume, as an example, that the training image and the input image at a time of inference are pathological images in which a cell specimen is contained as a subject. In this case, the comparing section 11 uses a histogram which shows the relationship between the pixel value (the value of brightness) and the number of pixels of the background area (an area of an image excluding the cell specimen) of each of the training image and the input image at a time of inference, to make a comparison. In other words, the comparing section 11 treats the pixel value in the background area of each of the training image and the input image at a time of inference as the level of noise of each of the training image and the input image at a time of inference, to make a comparison.

As an example, the comparing section 11 calculates the mean value, the median value, and the 95% confidence interval of the level of noise of each of the training image and the input image at a time of inference, to make a compassion.

(Example Process 3 Carried Out by Comparing Section 11)

Figure 5:
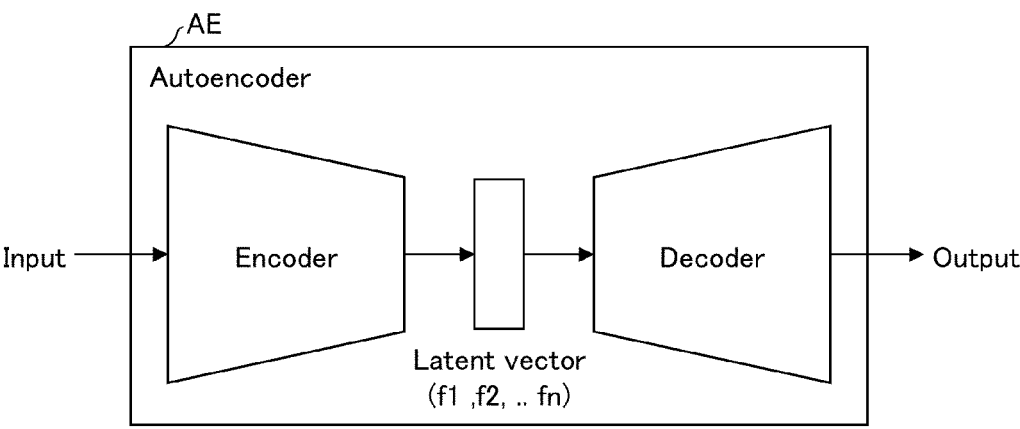
FIG. 5 is a diagram illustrating an example of an auto-encoder and a latent vector in the second example embodiment of the present invention.

The comparing section 11 may compare latent vectors, which are the characteristic of the training image and the input image at a time of inference, the latent vectors being obtained by inputting the training image and the input image at a time of inference to an autoencoder AE which have been trained with use of training images. The autoencoder AE and the latent vector will be described with reference to FIG. 5. FIG. 5 is a diagram illustrating an example of the autoencoder AE and the latent vector in the present example embodiment.

The autoencoder AE includes an Encoder and a Decoder, as illustrated in FIG. 5. The autoencoder AE is generated through unsupervised learning in which training images are used. The autoencoder AE compresses the dimension of an inputted image via the Encoder, to reduce the dimension to that of a latent vector, which is an important characteristic representation. The autoencoder AE then outputs an image having undergone decompression processing via the Decoder so that the dimension is restored to be the former dimension again.

The comparing section 11 inputs a training image and an input image at a time of inference, and acquires a latent vector of each of the training image and the input image at a time of inference, the latent vector being generated by the Encoder of the autoencoder AE, to make a comparison. The comparing section 11 may input a plurality of training images (or input images) to the autoencoder AE, and use the mean value of the plurality of latent vectors acquired, to make a comparison.

Assume, as an example, that latent vectors acquired by inputting a training image to the autoencoder AE are $(f_L1, f_L2, \ldots, f_Ln)$, and latent vector acquired by inputting an input image at a time of inference to the autoencoder AE are $(f_I1, f_I2, \ldots, f_In)$. In this case, the comparing section 11 make comparisons between $f_L1$ and $f_I1$, between $f_L2$ and $f_I2, \ldots$, and between $f_Ln$ and $f_In$.

(Example Process 1 Carried Out by Calculating Section 12)

Referring again to FIG. 4, examples of a process of the calculating section 12 calculating an index in a case where the comparing section 11 compares the pixel values of each of the colors RGB, which are the characteristics, between the training image and the input image at a time of inference will be described.

Assume that the comparing section 11 uses histogram which shows the relationship between the pixel value and the number of pixels of each of the colors RGB of each of the training image and the input image at a time of inference, to make a comparison. In this case, the calculating section 12 first calculates differences in the mean value, the median value, and the mode value of each of the colors RGB between the training image and the input image at a time of inference. Assume, for example, that the calculating section 12 calculates respective differences between the mean value A1, the median value M1, and the mode value F1 of R of the training image, and the mean value A2, the median value M2, and the mode value F2 of R of the input image at a time of inference. In this case, the calculating section 12 calculates (A1–A2), (M1–M2), and (F1–F2). The calculating section 12 carries out the same calculation regarding each of the colors GB.

Subsequently, the calculating section 12 calculates indexes in accordance with the differences calculated. As an example, the calculating section 12 may treat the calculated differences (A1–A2), (M1–M2), and (F1–F2) as the indexes.

(Example Process 2 Carried Out by Calculating Section 12)

Assume that the comparing section 11 compares the levels of noise contained in the training image and the input image at a time of inference, which are the characteristics of the training image and the input image at a time of inference. In this case, the calculating section 12 first calculates respective differences between the mean value, the median value, and the 95% confidence interval of the level of noise contained in the training image, and the mean value, the median value, and the 95% confidence interval of the level of noise contained in the input image at a time of inference.

Subsequently, the calculating section 12 calculates indexes in accordance with the differences calculated. As an example, the calculating section 12 may treat the calculated differences as the indexes.

(Example Process 3 Carried Out by Calculating Section 12)

Assume that the comparing section 11 compares latent vectors, which are the characteristic of the training image and the input image at a time of inference, obtained by inputting a training image and an input image at a time of inference to the autoencoder AE. In this case, the calculating section 12 first calculates a difference between the respective latent vectors of the training image and the input image at a time of inference.

Assume, for example, that latent vectors acquired by inputting a training image to the autoencoder AE are $(f_L1, f_L2, \ldots, f_Ln)$, and latent vectors acquired by inputting an input image at a time of inference to the autoencoder AE are $(f_I1, f_I2, \ldots, f_In)$. In this case, the comparing section 11 calculates $(f_L1–f_I1)$, $(f_L2–f_I2), \ldots$, and $(f_Ln–f_In)$, which are the differences.

Subsequently, the calculating section 12 calculates indexes in accordance with the differences calculated. As an example, the calculating section 12 may treat the calculated differences as the indexes.

In this respect, a configuration may be employed in which the calculating section 12 calculates a difference between the respective latent vectors of the training image and the input image at a time of inference, in a case where the difference between the input image at a time of inference inputted to the autoencoder AE and an output image outputted from the autoencoder AE is large, i.e., the decompression accuracy is not good. As an example, the calculating section 12 calculates a difference which is a mean square error between the input image at a time of inference and the output image outputted in a case where the input image at a time of inference is inputted to the autoencoder AE. In this case, in a case where the difference calculated is greater than a predetermined value, the calculating section 12 calculates a difference between the respective latent vectors of the training image and the input image at a time of inference.

As described above, the autoencoder AE is generated by unsupervised learning in which training images are used. Therefore, in a case where an input image at a time of inference which does not agree in the characteristics of data with the training image is inputted, an image having a large difference from the input image at a time of inference is outputted from the autoencoder AE. In contrast, in a case where an input image at a time of inference which agrees in the characteristics of data with the training image is inputted, an image having a small difference from the input image at a time of inference is outputted from the autoencoder AE.

As above, in a case where the difference between the input image at a time of inference inputted to the autoencoder AE and the output image outputted from the autoencoder AE is greater than a predetermined value, there is a high possibility that domain shift, which means that the training image does not agree in the characteristics of data with the input image at a time of inference, has occurred. Therefore, the calculating section 12 may calculate a difference between the respective latent vectors of the training image and the input image at a time of inference, in a case where the difference between the input image at a time of inference inputted to the autoencoder AE and the output image outputted from the autoencoder AE is greater than a predetermined value.

In contrast, in a case where the difference between the input image at a time of inference inputted to the autoencoder AE and the output image outputted from the autoencoder AE is smaller than the predetermined value, there is a high possibility that domain shift has not occurred. In this case, the calculating section 12 optionally does not calculate the difference between the respective latent vectors of the training image and the input image at a time of inference.

(Example Process 4 Carried Out by Calculating Section 12)

In a configuration other than the configuration in which a calculated difference is treated as the index, the calculating section 12 may judge whether the difference is equal to or greater than a threshold value, and calculate an index which is a predetermined probability according to the judgment result. For example, in a case where the difference is equal to or greater than the threshold value, an index which is a probability of error in a classification result of "80%" is calculated. Conversely, in a case where the difference is smaller than the threshold value, an index which is a probability of error in a classification result of "20%" is calculated.

In this configuration, the calculating section 12 may use a plurality of threshold values to judge, as to each of the plurality of threshold values, that the difference is equal to or greater than that threshold value, and calculate the index. For example, in a case where the difference is equal to or greater than a first threshold value, the calculating section 12 calculates an index which is a probability of error in a classification result of "80%". In contrast, in a case where the difference is smaller than the first threshold value, the calculating section 12 judges whether the difference is equal to or greater than a second threshold value which is smaller than the first threshold value. In a case where the difference is equal to or greater than the second threshold value, the calculating section 12 calculates an index which is a probability of error in a classification result of "50%". In contrast, in a case where the difference is smaller than the second threshold value, the calculating section 12 calculates an index which is a probability of error in a classification result of "20%". As above, the calculating section 12 calculates the difference such that the probability of error in a classification result is higher when the value of the difference is larger.

(Example Process Carried Out by Judging Section 23)

When the calculating section 12 judges an index which is a difference in each of the mean value, the median value, and the mode value of each of the colors RGB between the training image and the input image at a time of inference, the judging section 23 judges whether each index is equal to or greater than a threshold value. That is, the judging section 23 judges whether the index of each of the mean value of R, the median value of R, the mode value of R, the mean value of G, the median value of G, the mode value of G, the mean value of B, the median value of B, and the mode value of B is equal to or greater than a threshold value.

In addition, also in a case where the calculating section 12 calculates an index which is the difference in each of the mean value, the median value, and the 95% confidence interval between the respective levels of noise contained in the training image and the input image at a time of inference, the judging section 23 judges whether each index is equal to or greater than a threshold value.

Further, in a case where the calculating section 12 calculates an index which is the difference between the respective latent vectors of the training image and the input image at a time of inference, the judging section 23 judges whether the index of each of the latent vectors is equal to or greater than a threshold value.

Furthermore, in a case where the calculating section 12 calculates an index which is a probability, the judging section 23 judges whether each probability is equal to or greater than a threshold value.

(Example Process 1 Carried Out by Notifying Section 24)

In a case where the judging section 23 has judged whether a plurality of indexes are equal to or greater than respective threshold values, when, for example, at least one index has been judged to be equal to or greater than a threshold value, the notifying section 24 may notify a classification result and an indication of a possibility of error in the classification result.

Assume, for example, that the judging section 23 judges whether the index of each of the mean value of R, the median value of R, the mode value of R, the mean value of G, the median value of G, the mode value of G, the mean value of B, the median value of B, and the mode value of B is equal to or greater than a threshold value, and the index of the median value of R is equal to or greater than a threshold value. In this case, at least one of the plurality of indexes has been judged to be equal to or greater than the threshold value, and the notifying section 24 thus notifies the classification result and an indication of a possibility of error in the classification result.

As another example, in a case where the judging section 23 has judged whether a plurality of indexes are equal to or greater than respective threshold values, when a predetermined number or more of the indexes has been judged to be equal to or greater than the respective threshold values, the notifying section 24 may notify a classification result and an indication of a possibility of error in the classification result.

(Example Process 2 Carried Out by Notifying Section 24)

Assume, for example, that: the input image is a pathological image in which a cell specimen is contained as a subject; the classification result is "benign"; and the judging section 23 has judged that the index is equal to or greater than a threshold value. In this case, the notifying section 24 outputs, for example, "benign", which is the classification result, and information which indicates a possibility of error in the classification result and which is a text reading "there is a possibility that the classification result is erroneous", via the communicating section 26 or the outputting section 28.

(Example Process 3 Carried Out by Notifying Section 24)

The notifying section 24 may further notify information regarding an index which has been judged to be equal to or greater than a threshold value. As an example, in a case where the index of the median value of R is equal to or greater than a threshold value, the notifying section 24 may notify a classification result, an indication of a possibility of error in the classification result, and an indication of difference in the median value of R between the training image and the input image at a time of inference.

As another example of the notifying section 24 notifying information regarding an index which has been judged to be equal to or greater than a threshold value, in a case where the judging section 23 has judged that a difference $(f_Lm-f_fm)$ between latent vectors is equal to or greater than a threshold value, the notifying section 24 may notify an indication that the $m^{th}$ latent vectors differ from each other, in addition to a classification result and an indication of a possibility of error in the classification result.

(Flow of Error Notification Method S2)

Figure 6:
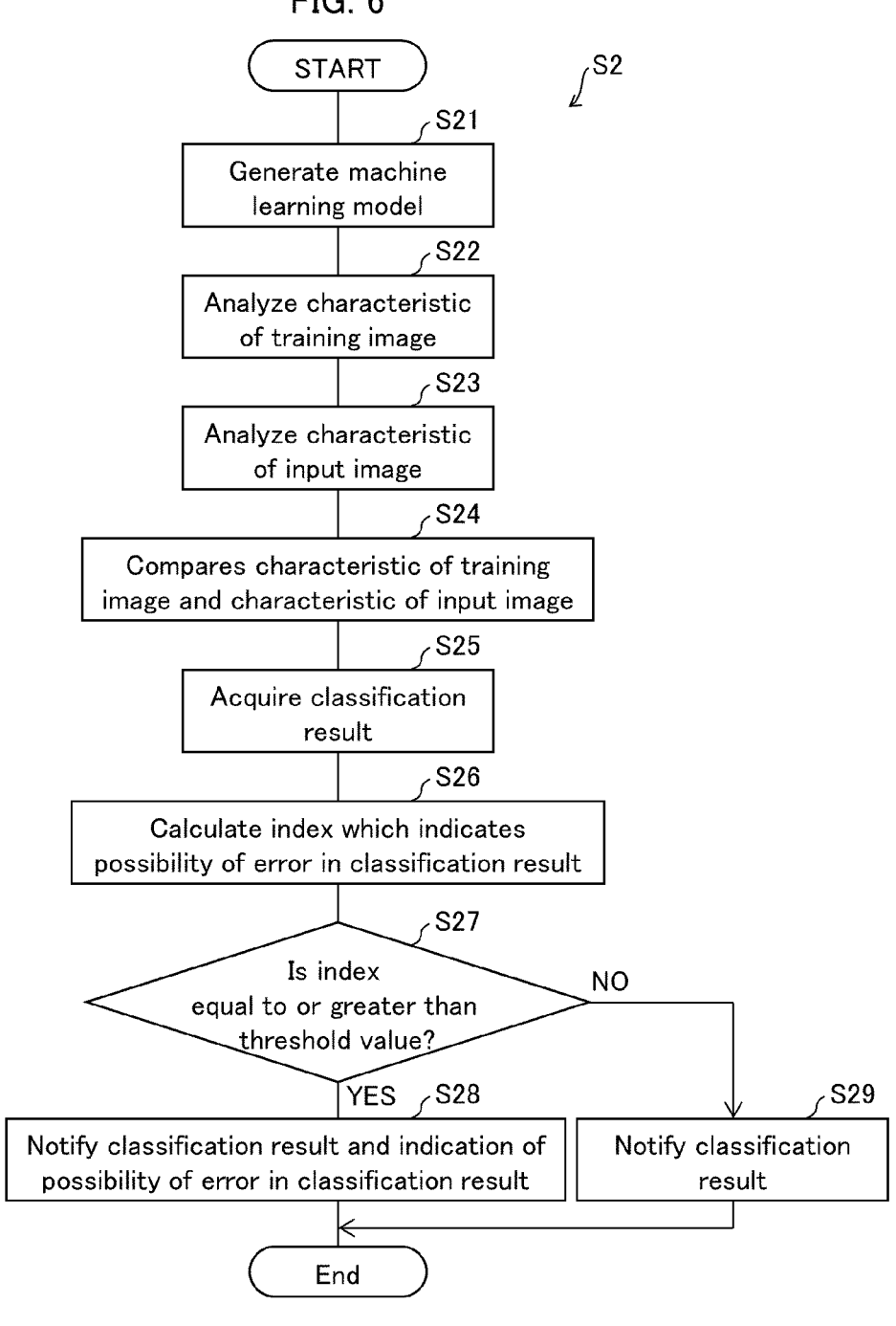
FIG. 6 is a flowchart illustrating a flow of an error notification method in accordance with the second example embodiment of the present invention.

A flow of an error notification method S2 in accordance with the present example embodiment will be described with reference to FIG. 6. FIG. 6 is a flowchart illustrating a flow of the error notification method S2 in accordance with the present example embodiment.

(Step S21)

In step S21, the training section 22 uses a training image stored in the storage section 25, to generate a machine learning model which receives, as an input, an image to be subjected to inference, to classify the image.

(Step S22)

In step S22, the comparing section 11 analyzes a characteristic of the training image stored in the storage section 25. The comparing section 11 stores the analysis result in the storage section 25.

(Step S23)

In step S23, the comparing section 11 analyzes the characteristic of an input image at a time of inference stored in the storage section 25. The comparing section 11 stores the analysis result in the storage section 25.

(Step S24)

In step S24, the comparing section 11 compares the characteristic of the training image and the characteristic of the input image at a time of inference, in accordance with the analysis result stored in the storage section 25. The comparing section 11 stores the comparison result in the storage section 25.

(Step S25)

In step S25, the control section 21 inputs an input image at a time of inference to the machine learning model generated in step S21, and acquires a classification result outputted by the machine learning model. The control section 21 stores the acquired classification result in the storage section 25.

(Step S26)

In step S26, the calculating section 12 acquires the comparison result stored in the storage section 25. The calculating section 12 calculates a difference between a characteristic of the training image and a characteristic of the input image at a time of inference, in accordance with the comparison result acquired. Subsequently, the calculating section 12 calculates, in accordance with the difference calculated, an index which indicates a possibility of error in a classification result obtained in a case where the input image at a time of inference is inputted to the machine learning model.

As above, the error notification method S2 includes processes carried out in the index calculation method S1 described above.

(Step S27)

In step S27, the judging section 23 judges whether the index calculated by the calculating section 12 is equal to or greater than a threshold value.

(Step S28)

In a case where the index has been judged to be equal to or greater than the threshold value in step S27 (step S27: YES), the notifying section 24 notifies, in step S28, the classification result stored in the storage section 25 and an indication of a possibility of error in the classification result. In this respect, the notifying section 24 may notify information regarding the index which has been judged to be equal to or greater than the threshold value, in addition to the classification result and the indication of a possibility of error in the classification result, as described above.

(Step S29)

Conversely, in a case where the index has been judged to be smaller than the threshold value in step S27 (step S27: NO), the notifying section 24 notifies the classification result in step S29.

(Example Advantage of Prediction Error Notifying Apparatus 2)

As above, the configuration employed in the prediction error notifying apparatus 2 in accordance with the present example embodiment is such that a judging section 23 and a notifying section 24 are included, the judging section 23 being for judging whether an index is equal to or greater than a threshold value, the notifying section 24 being for notifying the classification result and an indication of a possibility of error in the classification result in a case where the judging section 23 has judged that the index is equal to or greater than the threshold value.

Therefore, in a case where the index is equal to or greater than the threshold value, i.e., in a case where there is a high possibility that domain shift has occurred, the prediction error notifying apparatus 2 in accordance with the present example embodiment notifies an indication of a possibility of error in the classification result. Thus, the prediction error notifying apparatus 2 in accordance with the present example embodiment provides an example advantage of being capable of notifying a user of a possibility of error in a prediction result outputted by a machine learning model, in a case where there is a high possibility that domain shift has occurred.

Software Implementation Example

Some or all of the functions of each of the index calculating apparatus 1 and the prediction error notifying apparatus 2 may be implemented by hardware such as an integrated circuit (IC chip), or may be implemented by software.

Figure 7:
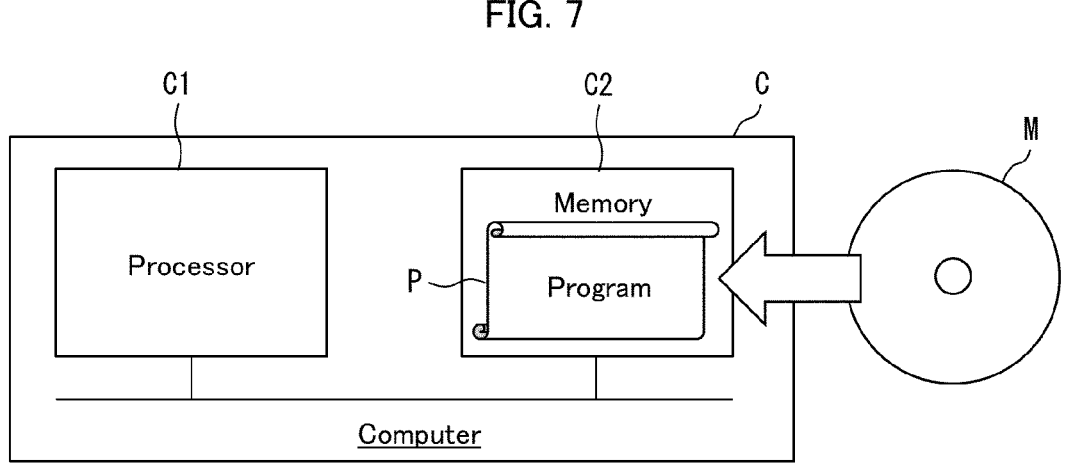
FIG. 7 is a block diagram illustrating an example of the hardware configuration of the index calculating apparatus and the prediction error notifying apparatus in accordance with the example embodiments of the present invention.

In the latter case, each of the index calculating apparatus 1 and the prediction error notifying apparatus 2 are provided by, for example, a computer that executes instructions of a program that is software implementing the foregoing functions. An example (hereinafter, computer C) of such a computer is illustrated in FIG. 7. The computer C includes at least one processor C1 and at least one memory C2. The memory C2 has recorded thereon a program P for causing the computer C to operate as the index calculating apparatus 1 and the prediction error notifying apparatus 2. The processor C1 of the computer C retrieves the program P from the memory C2 and executes the program P, so that the functions of the index calculating apparatus 1 and the prediction error notifying apparatus 2 are implemented.

Examples of the processor C1 can include a central processing unit (CPU), a graphic processing unit (GPU), a digital signal processor (DSP), a micro processing unit (MPU), a floating point number processing unit (FPU), a physics processing unit (PPU), a tensor processing unit (TPU), a quantum processor, a microcontroller, and a combination thereof. Examples of the memory C2 can include a flash memory, a hard disk drive (HDD), a solid state drive (SSD), and a combination thereof.

The computer C may further include a random access memory (RAM) into which the program P is loaded when executed and in which various kinds of data are temporarily stored. The computer C a may further include communication interface via which data is transmitted to and received from another apparatus. The computer C may further include an input-output interface via which input-output equipment such as a keyboard, a mouse, a display or a printer is connected.

The program P can be recorded on a non-transitory, tangible recording medium M capable of being read by the computer C. Examples of such a recording medium M can include a tape, a disk, a card, a semiconductor memory, and a programmable logic circuit. The computer C can obtain the program P via such a recording medium M. Alternatively, the program P can be transmitted via a transmission medium. Examples of such a transmission medium can include a communication network and a broadcast wave. The computer C can obtain the program P also via such a transmission medium.

[Additional Remark 1]

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

[Additional Remark 2]

The whole or part of the example embodiments disclosed above can be described as, but not limited to, the following supplementary notes.

(Supplementary Note 1)

An index calculating apparatus including: a comparing means for comparing a characteristic of a training image used in machine learning of a machine learning model which receives, as an input, an image to be subjected to inference, to classify the image and a characteristic of an input image to be inputted to the machine learning model at a time of inference; and a calculating means for calculating, in accordance with a difference between the characteristic of the training image and the characteristic of the input image which have been compared with each other by the comparing means, an index which indicates a possibility of error in a classification result obtained in a case where the input image is inputted to the machine learning model.

(Supplementary Note 2)

The index calculating apparatus described in supplementary note 1, further including: a judging means for judging whether the index is equal to or greater than a threshold value; and a notifying means for notifying the classification result and an indication of a possibility of error in the classification result, in a case where the judging means judges that the index is equal to or greater than the threshold value.

(Supplementary Note 3)

The index calculating apparatus described in supplementary note 2, in which the notifying means further notifies information regarding the index that has been judged to be equal to or greater than the threshold value, in a case where the judging means has judged that the index is equal to or greater than the threshold value.

(Supplementary Note 4)

The index calculating apparatus described in any one of supplementary notes 1 to 3, in which the characteristic is at least one selected from the group consisting of: color or brightness of the input image and the training image; a level of noise contained in the input image and the training image; and a latent vector obtained by inputting the training image and the input image to an autoencoder having been trained with use of the training image.

(Supplementary Note 5)

An index calculation method including: an index calculating apparatus comparing a characteristic of a training image used in machine learning of a machine learning model which receives, as an input, an image to be subjected to inference, to classify the image and a characteristic of an input image to be inputted to the machine learning model at a time of inference; and the index calculating apparatus calculating, in accordance with a difference between the characteristic of the training image and the characteristic of the input image which have been compared with each other in the comparing, an index which indicates a possibility of error in a classification result obtained in a case where the input image is inputted to the machine learning model.

(Supplementary Note 6)

A program for causing a computer to function as an index calculating apparatus, the program causing the computer to function as: a comparing means for comparing a characteristic of a training image used in machine learning of a machine learning model which receives, as an input, an image to be subjected to inference, to classify the image and a characteristic of an input image to be inputted to the machine learning model at a time of inference; and a calculating means for calculating, in accordance with a difference between the characteristic of the training image and the characteristic of the input image which have been compared with each other by the comparing means, an index which indicates a possibility of error in a classification result obtained in a case where the input image is inputted to the machine learning model.

[Additional Remark 3]

The whole or part of the example embodiments disclosed above can further be expressed as follows.

An index calculating apparatus including at least one processor, the at least one processor carrying out: a comparing process of comparing a characteristic of a training image used in machine learning of a machine learning model which receives, as an input, an image to be subjected to inference, to classify the image and a characteristic of an input image to be inputted to the machine learning model at a time of inference; and a calculating process of calculating, in accordance with a difference between the characteristic of the training image and the characteristic of the input image which have been compared with each other in the comparing process, an index which indicates a possibility of error in a classification result obtained in a case where the input image is inputted to the machine learning model.

This index calculating apparatus may further include a memory, and this memory may have stored therein a program for causing the at least one processor to carry out the comparing process and the calculating process. In addition, this program may be recorded on a computer-readable, non-transitory, and tangible recording medium.

REFERENCE SIGNS LIST

1: Index calculating apparatus
2: Prediction error notifying apparatus
11: Comparing section
12: Calculating section
23: Judging section
24: Notifying section

What is claimed is:

1. An index calculating apparatus comprising
at least one processor, the at least one processor carrying out:
a comparing process of comparing
    a characteristic of a training image used in machine learning of a machine learning model which receives, as an input, an image to be subjected to inference, to classify the image and
    a characteristic of an input image to be inputted to the machine learning model at a time of inference; and
a calculating process of calculating, in accordance with a difference between the characteristic of the training image and the characteristic of the input image which have been compared with each other in the comparing process, an index which indicates a possibility of error in a classification result obtained in a case where the input image is inputted to the machine learning model,
wherein the characteristic of the training image and the characteristic of the input image comprises:
    a level of noise contained in the input image and the training image; and
    a latent vector obtained by inputting the training image and the input image to an autoencoder having been trained with use of the training image,
wherein the image to be subjected to inference is a pathological image in which a cell specimen is contained as a subject, and
the machine learning model is trained so as to output a result of classification regarding whether the cell specimen is a cancer cell.

2. The index calculating apparatus according to claim 1, wherein
the at least one processor further carries out:
a judging process of judging whether the index is equal to or greater than a threshold value; and
a notifying process of notifying the classification result and an indication of a possibility of error in the classification result, in a case where in the judging process, the index has been judged to be equal to or greater than the threshold value.

3. The index calculating apparatus according to claim 2, wherein
the at least one processor further notifies, in the notifying process, information regarding the index that has been judged to be equal to or greater than the threshold value, to assist a user in decision making, in a case where in the judging process, the index has been judged to be equal to or greater than the threshold value.

4. An index calculation method comprising:
at least one processor comparing
    a characteristic of a training image used in machine learning of a machine learning model which receives, as an input, an image to be subjected to inference, to classify the image and
    a characteristic of an input image to be inputted to the machine learning model at a time of inference; and
the at least one processor calculating, in accordance with
    a difference between the characteristic of the training image and the characteristic of the input image which have been compared with each other in the comparing, an index which indicates a possibility of error in a classification result obtained in a case where the input image is inputted to the machine learning model,
wherein the characteristic of the training image and the characteristic of the input image comprises:
    a level of noise contained in the input image and the training image; and
    a latent vector obtained by inputting the training image and the input image to an autoencoder having been trained with use of the training image,
wherein the image to be subjected to inference is a pathological image in which a cell specimen is contained as a subject, and
the machine learning model is trained so as to output a result of classification regarding whether the cell specimen is a cancer cell.

5. A computer-readable, non-transitory recording medium having recorded thereon a program for causing a computer to function as an index calculating apparatus,
the program causing the computer to carry out:
a comparing process of comparing
    a characteristic of a training image used in machine learning of a machine learning model which receives, as an input, an image to be subjected to inference, to classify the image and
    a characteristic of an input image to be inputted to the machine learning model at a time of inference; and
a calculating process of calculating, in accordance with a difference between the characteristic of the training image and the characteristic of the input image which have been compared with each other in the comparing process, an index which indicates a possibility of error in a classification result obtained in a case where the input image is inputted to the machine learning model,
wherein the characteristic of the training image and the characteristic of the input image comprises:
    a level of noise contained in the input image and the training image; and
    a latent vector obtained by inputting the training image and the input image to an autoencoder having been trained with use of the training image,
wherein the image to be subjected to inference is a pathological image in which a cell specimen is contained as a subject, and
the machine learning model is trained so as to output a result of classification regarding whether the cell specimen is a cancer cell.

* * * * *